United States Patent
Muttik

(10) Patent No.: US 9,262,624 B2
(45) Date of Patent: Feb. 16, 2016

(54) DEVICE-TAILORED WHITELISTS

(75) Inventor: Igor Muttik, Berkhamsted (GB)

(73) Assignee: McAfee, Inc., Santa Clara, CA (US)

(*) Notice: Subject to any disclaimer, the term of this patent is extended or adjusted under 35 U.S.C. 154(b) by 105 days.

(21) Appl. No.: 13/234,985

(22) Filed: Sep. 16, 2011

(65) Prior Publication Data

US 2013/0074186 A1    Mar. 21, 2013

(51) Int. Cl.
| | | |
|---|---|---|
| G06F 11/00 | (2006.01) | |
| G06F 21/51 | (2013.01) | |
| G06F 21/57 | (2013.01) | |
| G06F 12/14 | (2006.01) | |
| G06F 12/16 | (2006.01) | |
| G06F 21/10 | (2013.01) | |
| G06F 21/44 | (2013.01) | |

(52) U.S. Cl.
CPC ............ *G06F 21/51* (2013.01); *G06F 21/57* (2013.01); *G06F 21/10* (2013.01); *G06F 21/445* (2013.01)

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,663,000 B1 | 12/2003 | Muttik et al. | |
| 7,243,373 B2 | 7/2007 | Muttik et al. | |
| 7,506,155 B1 | 3/2009 | Stewart et al. | |
| 7,739,100 B1 | 6/2010 | Muttik et al. | |
| 8,306,988 B1 * | 11/2012 | Jyoti | G06F 17/30584 707/711 |
| 2002/0169975 A1 * | 11/2002 | Good | H04L 41/0806 726/1 |
| 2003/0046611 A1 | 3/2003 | Muttik et al. | |
| 2003/0061502 A1 | 3/2003 | Teblyashkin et al. | |
| 2004/0199827 A1 | 10/2004 | Muttik et al. | |
| 2005/0154900 A1 | 7/2005 | Muttik | |
| 2006/0036690 A1 * | 2/2006 | O'Neil | H04L 51/12 709/206 |
| 2006/0150256 A1 | 7/2006 | Fanton et al. | |
| 2008/0104186 A1 * | 5/2008 | Wieneke | G06Q 10/107 709/206 |
| 2011/0167261 A1 * | 7/2011 | Fanton | G06F 21/10 713/165 |
| 2012/0158989 A1 * | 6/2012 | Patil | G06Q 30/02 709/235 |
| 2012/0240183 A1 * | 9/2012 | Sinha | H04W 12/08 726/1 |
| 2013/0018967 A1 * | 1/2013 | Gannu | H04L 67/22 709/206 |

FOREIGN PATENT DOCUMENTS

| | | |
|---|---|---|
| CN | 101968836 A | 2/2011 |
| CN | 102067678 A | 5/2011 |
| KR | 10-2011-0050939 A | 5/2011 |
| WO | WO 2013/040460 A1 | 3/2013 |

OTHER PUBLICATIONS

International Search Report and Written Opinion for International Application No. PCT/US2012/055582 mailed Dec. 27, 2012 (9 pages).

(Continued)

*Primary Examiner* — Dede Zecher
*Assistant Examiner* — Trang Doan
(74) *Attorney, Agent, or Firm* — Patent Capital Group

(57) ABSTRACT

A particular set of attributes of a particular computing device is identified. A first plurality of whitelisted objects is identified in a global whitelist corresponding to the particular set of attributes. A particular whitelist is generated to include the identified set of whitelisted objects, the particular whitelist tailored to the particular computing device. In some aspects, device-tailored updates to the particular whitelist are also generated.

17 Claims, 8 Drawing Sheets

(56) References Cited

OTHER PUBLICATIONS

International Preliminary Report on Patentability for International Application No. PCT/US2012/055582 mailed Mar. 18, 2014, 5 pages.

Supplementary European Search Report in Application No. EP 12 83 1025, mailed on Apr. 1, 2015, 6 pages.
Office Action and Search Report in CN 201280048131.6, mailed on Oct. 20, 2015, English translation, 15 pages.

* cited by examiner

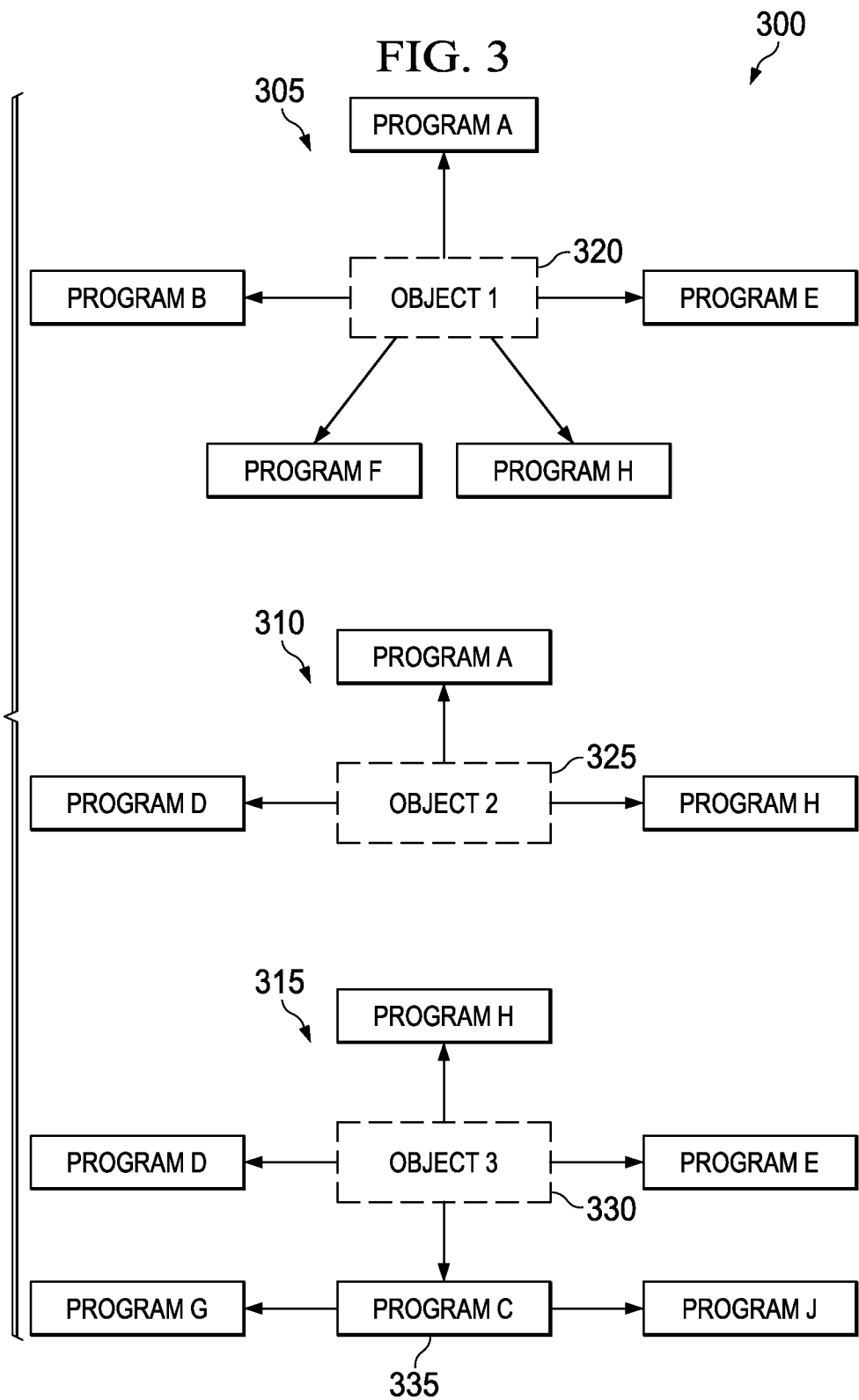

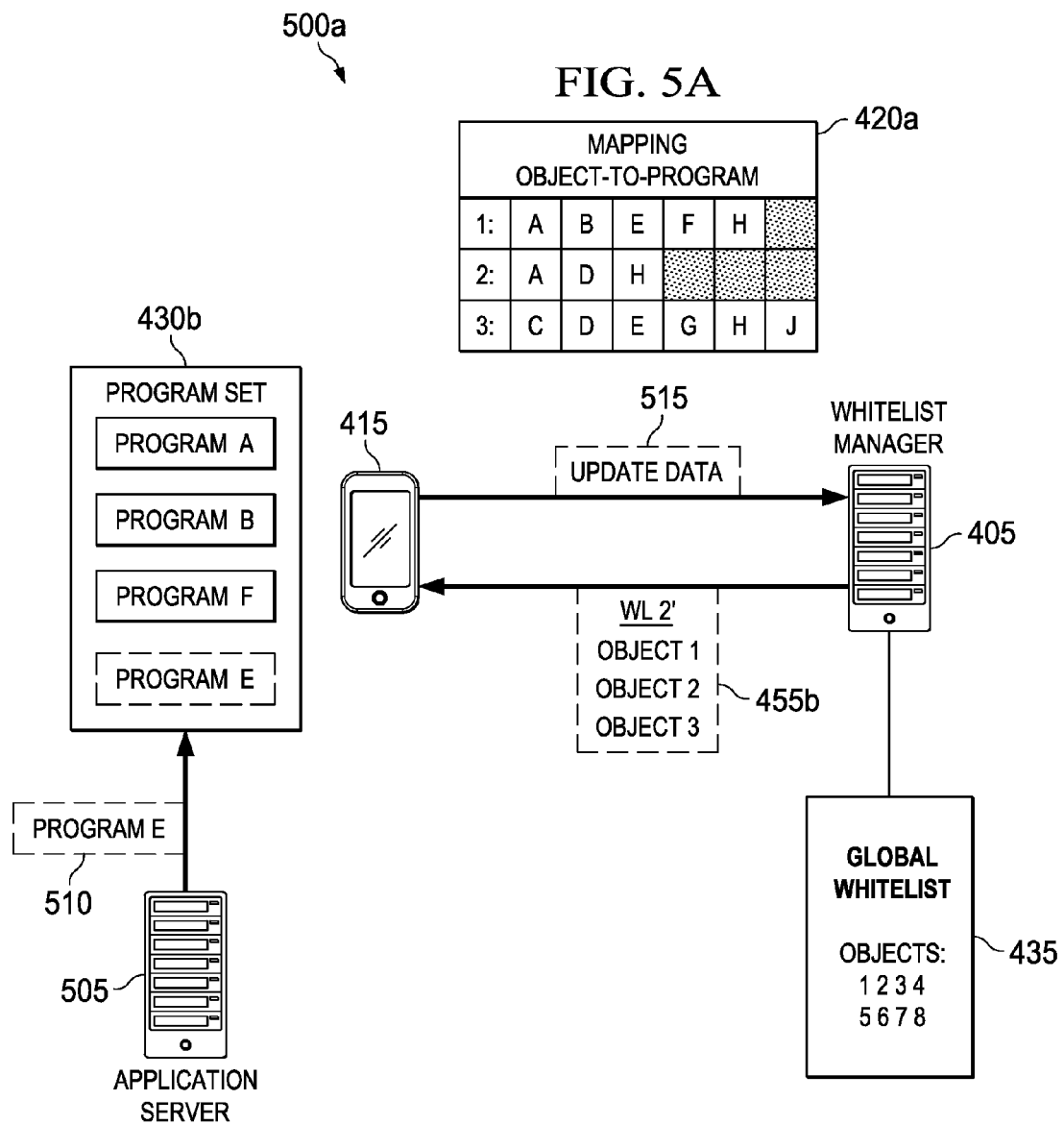

DEVICE-TAILORED WHITELISTS

TECHNICAL FIELD

This disclosure relates in general to the field of computer security and, more particularly, to whitelists for use in malware and other computer security products.

BACKGROUND

The Internet has enabled interconnection of different computer networks all over the world. The ability to effectively protect and maintain stable computers and systems, however, presents a significant obstacle for component manufacturers, system designers, and network operators. This obstacle is made even more complicated due to the continually-evolving array of tactics exploited by malicious software authors. Malicious software authors create malicious software ("malware") to disrupt or stop computer operations, steal information, gain unauthorized access to system resources, and conduct other unauthorized abusive, hostile, intrusive, or annoying activities. Malware continues to evolve with new malware objects being developed potentially exposing computers and systems every day.

Malware detection and prevention software, among other computer security products, have been developed to detect, block, disable, quarantine, and delete malware from systems using the computer security products. One of the challenges facing computer security products is distinguishing malware from ostensibly non-malicious software objects. Complicating this endeavor is the reality that hundreds of thousands of new software objects, both malicious and non-malicious are created every day. Some security products use whitelists to distinguish non-malicious, whitelisted objects from malicious objects. Whitelists can also serve as a record of the classification of a detected object as either malicious or non-malicious. Ideally, whitelists, in order to be optimally effective, should be as comprehensive as possible. Maintaining and creating a comprehensive whitelist can be a challenge given the steady flow of new software objects that need to be categorized as malicious or not.

BRIEF DESCRIPTION OF THE DRAWINGS

FIG. 3 is a representation of an example mapping of known software objects to known software programs;

FIGS. 5A-5B illustrate examples of updating device-tailored whitelists in accordance with at least some embodiments.

Like reference numbers and designations in the various drawings indicate like elements.

DETAILED DESCRIPTION OF EXAMPLE EMBODIMENTS

Overview

Figure 1:
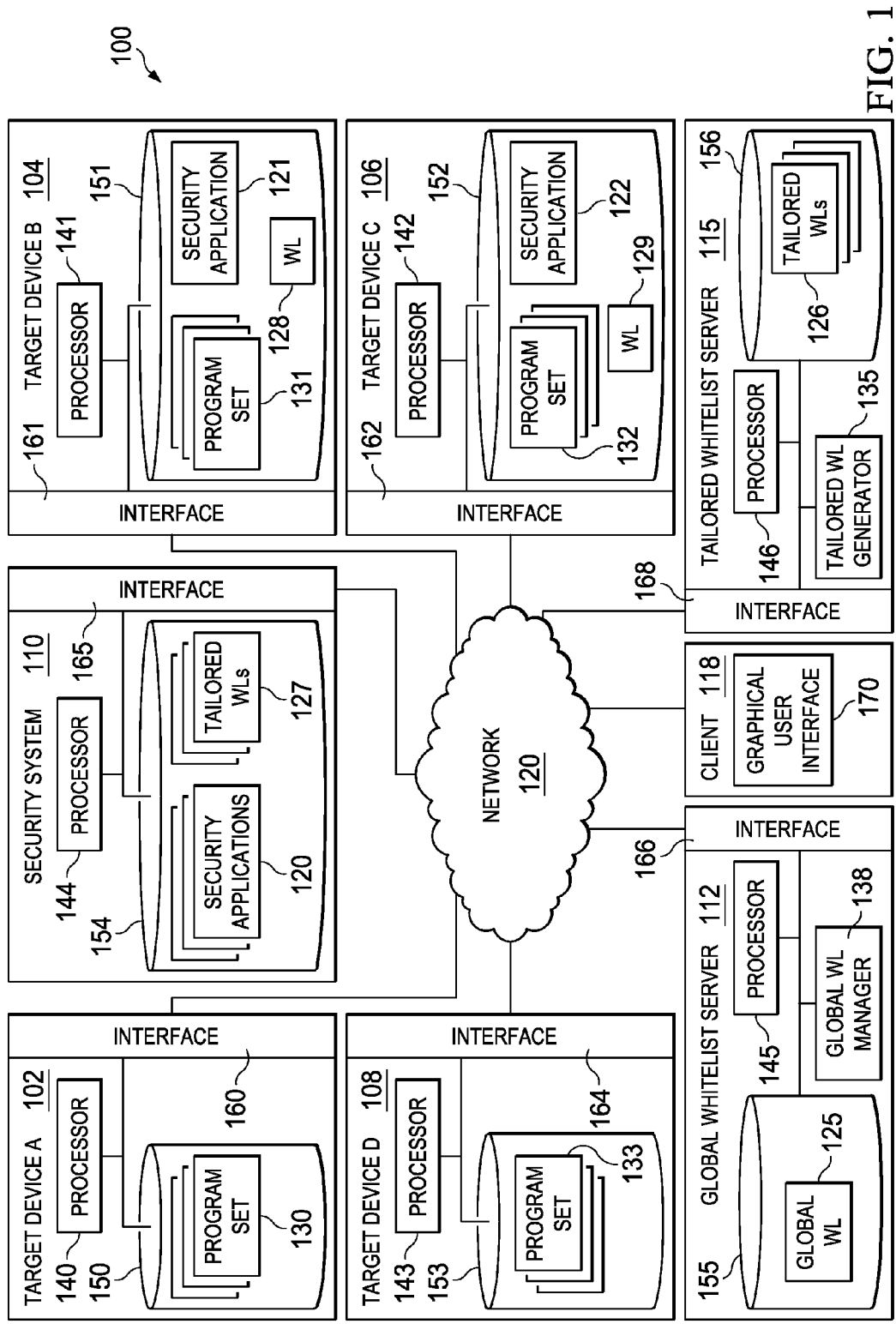
FIG. 1 is a simplified schematic diagram of a system for generating whitelists for computing devices in accordance with one embodiment.

In general, one aspect of the subject matter described in this specification can be embodied in methods that include the actions of identifying a particular set of attributes of a particular computing device. A first plurality of whitelisted objects can be identified in a global whitelist corresponding to the particular set of attributes. A particular whitelist can be generated that includes the identified set of whitelisted objects, the particular whitelist tailored to the particular computing device.

In another general aspect of the subject matter described in this specification can be embodied in systems that include at least one processor device, at least one memory element, and a tailored whitelist manager. The tailored whitelist manager, when executed by the at least one processor device, can identify a particular set of attributes of a particular computing device, identify a first plurality of whitelisted objects, in a global whitelist, corresponding to the particular set of attributes, and generate a particular whitelist including the identified set of whitelisted objects, the particular whitelist tailored to the particular computing device.

These and other embodiments can each optionally include one or more of the following features. The first plurality of whitelisted items can be a subset of whitelisted objects included in the global whitelist that includes less than all of the whitelisted objects in the global whitelist. The particular set of attributes can correspond to a set of software programs identified as potentially used by the particular computing device. The first plurality of whitelisted objects can be identified as usable by programs in the set of software programs. The first plurality of whitelisted objects can be identified as installed on the particular computing device. The set of software programs can include at least one of an operating system, application, software agent, driver, library or plugin. The particular whitelist can be used to perform at least one computer security task relating to the particular computing device. The particular whitelist can be served to a particular client configured to perform the security task. The particular security client can include the particular computing device. The particular computing device can include a mobile communications device. A second set of attributes can be identified of a second computing device, the second set of attributes different from the particular set of attributes. A second plurality of whitelisted objects can be identified in a global whitelist, the second plurality of whitelists objects corresponding to the second set of attributes and different from the first plurality of whitelisted objects. A second whitelist can generated including the second plurality of whitelisted objects.

Further, embodiments can each optionally include one or more of the following additional features. An update to the global whitelist can be identified. At least one update can be identified for the particular whitelist corresponding to the update to the global whitelist. An updated version of the particular whitelist can be generated corresponding to the at least one update for the particular whitelist. At least a portion of the updated version of the particular whitelist can be sent to a computing device tasked with performing computer security tasks on the particular computing device. The update to the global whitelist can include the addition of at least one new whitelist object. Associations can be mapped between the at least one new whitelist object and at least one device attribute. In other instances, a change on the particular computing device can be identified. At least one update to the particular whitelist can be determined to correspond to the identified change on the particular computing device. An updated version of the particular whitelist can be generated corresponding to the at least one update to the particular whitelist. The change on the particular computing device can be a predicted change and the at least one update to the particular whitelist can be determined prior to the change being implemented on the particular computing device. At least a portion of the updated version of the particular whitelist can be sent to a computing device tasked with performing computer security tasks on the particular computing device prior to the change being implemented on the particular computing device. The particular set of attributes can include at least one user attribute corresponding to a user of the particular computing device. Identifying the first plurality of whitelisted objects can include predicting that the particular computing device will access at least a subset of the first plurality of whitelist objects based on the user attribute.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example embodiment of a computing system 100 including a plurality of target computing devices (e.g., 102, 104, 106, 108) for which software security tasks can be performed. System 100 can further include one or more security system servers (e.g., 110), one or more global whitelist servers (e.g., 112), and one or more tailored whitelist servers (e.g., 115), as well as one or more client devices (e.g., 118) such as for use in administering or otherwise interacting with other devices and services in system 100. Computing system 100 can further include one or more wireless and/or wireline networks 120 through which combinations of devices and severs (e.g., 102, 104, 106, 108, 110, 112, 115, 118) may communicate, exchange data and messages, deliver or consume software-based services, and otherwise communicate and interact.

Target devices 102, 104, 106, 108 can include personal computing devices, such as desktop, laptop, tablet, smartphone, and other devices that have attributes that can differ widely from device to device, including the collection of software programs (e.g., 130, 131, 132, 133) loaded, installed, executed, operated, or otherwise accessible to the device. A device's set of programs can include operating systems, applications, plug-ins, applets, virtual machines, machine images, drivers, executable files, and other software-based programs capable of being run, executed, or otherwise used by the respective devices (e.g., 102, 104, 106, 108). Other attributes can also be maintained for a device, including identification of peripheral devices connected or otherwise accessible to the device, networks with which the device communicates, an identification or profile of an entity or person owning, loaning, administrating, or otherwise associated with the device, among other examples. Various software-based objects and resources can be accessed, uploaded, used, and otherwise encountered in connection with a device's use of programs in its program set including objects accessed from remote computing devices using one or more networks 120. Such software objects and resources (collectively "objects") can include malicious objects (i.e., "malware") as well as non-malicious objects. Various software- and hardware-based computer security tools, include anti-malware, policy control, and vulnerability assessment tools, can be used to protect devices 102, 104, 106, 108 in the system 100 from accessing or using malware and suffering the potentially detrimental effects of malware. Such computer security tools can include security applications, suites, services, and other tools (e.g., 120, 121, 122) run locally, remotely, or in-part both locally and remotely relative to the target device that perform security scans, firewalling, filtering, quarantining, deletion, and other security functions for a device at least partially using one or more whitelists. Whitelists can include, in some examples, a list of objects, including, in some instances, listings of cryptographic hashes of objects or files (or essential parts thereof). Further, hashing static objects, including both malware and clean software, typically does not affect the operability of the objects. Accordingly, whitelisting based on cryptographic hashes (e.g., MD4, MD5, SHA-1, SHA256, SHA512, SHA3, etc.) can be an effective method to prevent spoofing of whitelist entries, among other benefits.

In some instances, global whitelists (e.g., 125) can be consulted and used by one or more computer security tools (e.g., 120, 121, 122) in connection with the performance of software and network security checks performed on one or more computing devices and systems. A global whitelist 125 can be generated, updated, served, coordinated, and otherwise managed by a global whitelist server 112. The global whitelist server 112 can communicate with other devices to serve all or a portion of the global whitelist(s) to other devices. Additionally, in some instances, global whitelist server 112 can also communicate with a tailored whitelist server 115 in connection with the generation of tailored whitelists (e.g., 126, 127, 128, 129). A global whitelist can include a potentially limitless number of whitelisted objects known to exist among a universe of computing devices and networks, including worldwide public networks, such as the Internet. In some instances, the goal of a global whitelist can be to assemble as comprehensive a listing of software objects identified as non-malicious by providers of the whitelist as well as other contributors. Generally, global whitelists typically do not restrict the universe of whitelisted objects identified in the whitelist to particular systems, networks, or systems. This can be ideal from the standpoint of maintaining as comprehensive a record as possible of whitelisted objects that are or could potentially be relevant to any number of computers or systems. Modern global whitelists can include listings of upwards of ten billion distinct whitelisted objects. Identification of whitelisted objects for inclusion in a global whitelist can be automated to some degree, for instance, through the use of algorithms identifying objects meeting particular characteristics or criteria of the whitelist.

While, in some circumstances, it can be desirable to develop a comprehensive global whitelist adapted to maintain listings of non-malicious whitelists relevant to a universe of software applications, systems, operating systems, devices, networks, etc., the more comprehensive a global whitelist becomes, the larger and more cumbersome the data structure(s) and logic become that are used in the maintenance and implementation of the whitelist. While maintaining a large, comprehensive global whitelist can be advantageous in the abstract, it can be suboptimal in many instances. Such global whitelists can be shared with and intended for use by a plurality of different security tools and deployments of those tools, including tools 120, 121, 122. The size of a global whitelist, in some instances, can be prohibitively large, making communicating and distributing the whitelist difficult, particularly in instances where a computing device hosting a copy of the whitelist, has limited availability to network bandwidth, such as mobile computing devices utilizing mobile data networks. Similarly, providing updates to such global whitelists can be complicated by the whitelists' size. Further, processing large comprehensive whitelists can be expensive from a processing standpoint, as security tools search through and check against the potentially millions of entries in the whitelist.

Computing system 100, in some implementations, can resolve many of the issues identified above pertaining to traditional whitelists. In some instances, tailored whitelists can be generated from one or more global whitelists customized and optimized to a particular device or system that is to be scanned, protected, or otherwise serviced using a whitelist. For instance, a particular global whitelist may manage and identify a set of whitelisted objects, at least some of which are specific or relevant to only some software installations. For instance, some whitelisted objects in a particular global whitelist may only be accessible to (or are predicted to only be relevant to) particular software programs, applications, operating systems, plugins, applets, libraries, and the like. Accordingly, if one or more of such software programs are not installed on or otherwise likely to be accessed by a particular device, a global whitelist may be over-inclusive to the extent it includes whitelisted objects that are not relevant to the particular device. Accordingly, a more optimal whitelist can be generated for the particular device that omits those whitelisted items included in the global whitelist that corresponding to programs and attributes not present or used by the particular device. Devices that do include these programs, on the other hand, can have tailored whitelists generated that include the corresponding whitelisted items. Accordingly, tailored whitelists can be developed that include known, whitelisted objects that are determined to be relevant to the particular attributes of each device for which a whitelist is tailored. A tailored whitelist would likely be much smaller in size than a global whitelist but nonetheless comprehensive as it pertains to its particular device. Further, transmission and updating of the tailored whitelists can be significantly more efficient and practical as compared to the transmission and updating of a large global whitelist intended for use in connection with multiple, different devices with varying attributes and requirements.

As shown in the example system 100 illustrated in FIG. 1, a tailored whitelist server 115 can be provided including a tailored whitelist generator 135 adapted to generate tailored whitelists (e.g., 126, 127, 128, 129) corresponding to the attributes (e.g., 130, 131, 132, 133) of any one of a plurality of different devices (e.g., 102, 104, 106, 108) that could be used to perform security tasks using any one of a plurality of computer security tools (e.g., 120, 121, 122) or deployments of such tools. Tailored whitelist server 115 can communicate with other devices and serve tailored whitelists for use with security tools (e.g., 120, 121, 122). Indeed, in some instances, tailored whitelist server 115 can communicate with devices (e.g., 104, 106, 110) hosting deployments of security tools themselves, as well as devices (e.g., 102, 108) that may rely on remote security tools to provide security services for the device.

Tailored whitelists can be used in a manner similar to global whitelists. For instance, a security tool 121 executed at least in part on device B 104 can access a whitelist 128 tailored to the attributes and program set 131 of device B 104. In this example, device B 104 received or accesses its tailored whitelist 128 from tailored whitelist server 115, for instance, over network 120. In some instances, including providing security services for mobile devices, security tools (e.g., 120) may be provided remotely (e.g., as a service) from the devices upon which the security tools operate. For instance, security system 110 can perform computer security services for a plurality of different computing devices, such as devices A (102) and D (108). An outside computer security service can access local or cloud-based tailored whitelists corresponding to devices monitored by the security service 120 as well as, in some instances, tailored whitelists (e.g., 128, 129) stored or otherwise available through the monitored devices themselves. In short, security tools and tailored whitelists can be provided partially or wholly remote from corresponding devices monitored by the security tools, as well as partially or entirely local to the devices monitored by a locally-executed security tool.

In general, "servers," "clients," and "computing devices" (e.g., 102, 104, 106, 108, 110, 112, 115, 118) can comprise electronic computing devices operable to receive, transmit, process, store, or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Servers, clients, and computing devices (e.g., 102, 104, 106, 108, 110, 112, 115, 118) can each include one or more processors (e.g., 140-146), computer-readable memory (e.g., 150-156), and one or more interfaces (e.g., 160-166). Servers can include any suitable software component or module, or computing device(s) capable of hosting and/or serving a software application (e.g., 120, 135, 138), including distributed, enterprise, or cloud-based software applications. For instance, application servers can be configured to host, serve, or otherwise manage web services or applications, such as SOA-based or enterprise web services, or applications interfacing, coordinating with, or dependent on other enterprise services, including security-focused applications. Applications and services provided through application servers 106, 108 can further include web services under development. In some instances, some combination of servers can be hosted on a common computing system, server, or server pool, and share computing resources, including shared memory, processors, and interfaces, such as in an enterprise software system serving services to a plurality of distinct clients and customers.

Computing devices (e.g., 102, 104, 106, 108, 118) in system 100 can also include devices implemented as one or more local and/or remote client or endpoint devices, such as personal computers, laptops, smartphones, tablet computers, personal digital assistants, media clients, web-enabled televisions, telepresence systems, and other devices. A client or endpoint device can include any computing device operable to connect to or communicate with servers (e.g., 110, 112, 115), other endpoint devices, network 120, and/or other devices using a wireline or wireless connection. Each endpoint device can include at least one graphical display device and user interfaces (e.g., 170), allowing a user to view and interact with graphical user interfaces of applications and other programs provided in system 100. In general, endpoint devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," and "user" may be used interchangeably as appropriate without departing from the scope of this disclosure. Moreover, while each endpoint device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
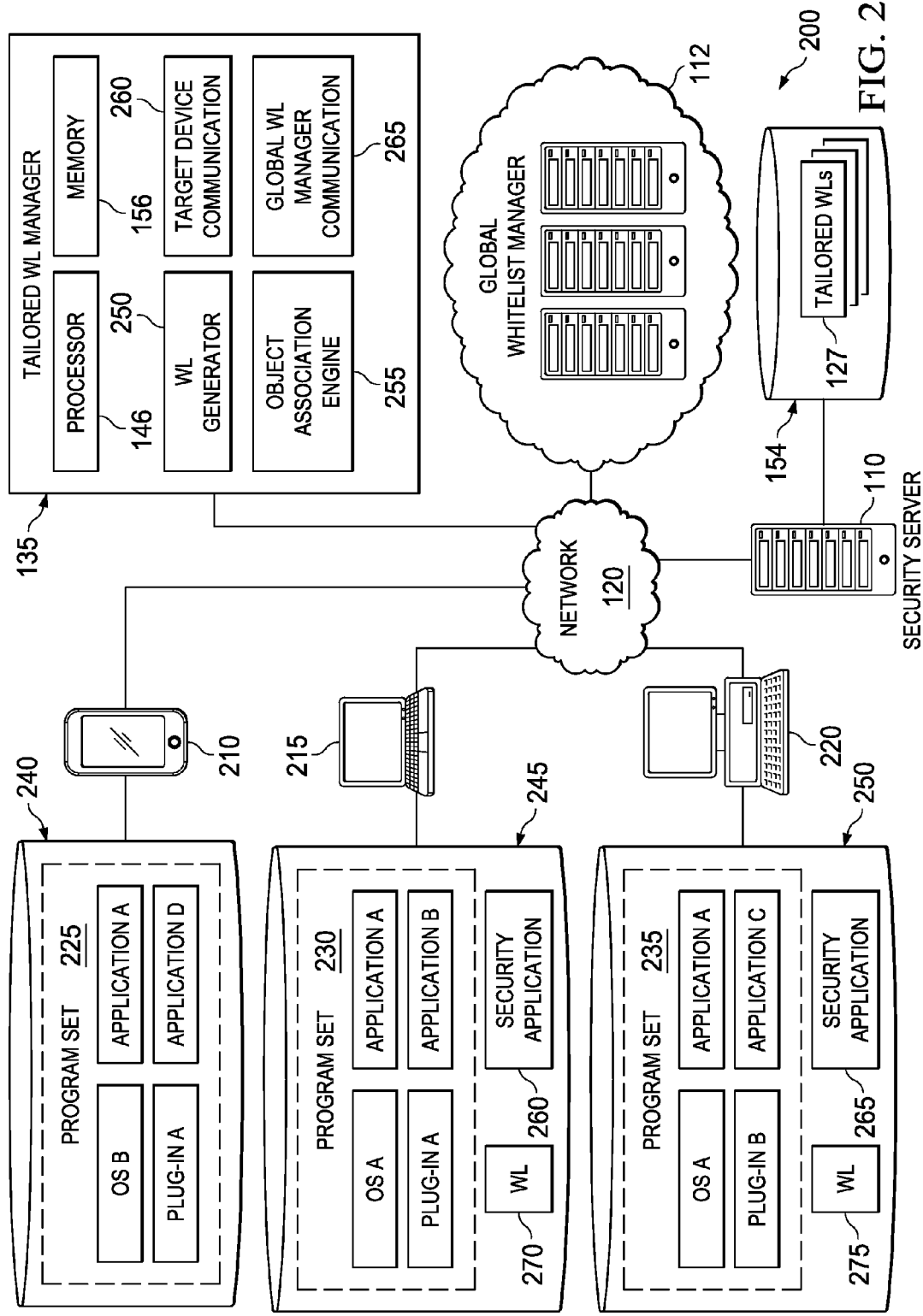
FIG. 2 is a simplified block diagram of an example system including an example whitelist generator in accordance with one embodiment.

Turning to FIG. 2, a simplified block diagram 200 is shown of an example system including an example implementation of a tailored whitelist manager 135. Tailored whitelist manager 135 can be used to provide, update, and manage whitelists (e.g., 127, 270, 275) each tailored to one of a plurality of computing devices (e.g., 210, 215, 225). Tailored whitelist manager 135 can include at least one processor 146 and at least one memory device 156, as well as various modules, subsystems, and other components, such as a whitelist generator 250, object association engine 255, target device communication module 260, global whitelist manager communication module 265, as well as other modules, including alternate functionality and/or configurations, including other combinations and divisions of the modules and functionality described herein.

A whitelist generator 250 can be adapted to generate a tailored whitelist for a particular device or system based on attributes of the device. The tailored whitelists generated by whitelist generator 250 can include those whitelisted objects and items determined to be relevant to the particular device, based on the particular device's attributes. Such attributes can provide insight into the types of objects, and particular objects, the particular device is likely to encounter or use. Attributes can include the set of programs (e.g., 225, 230, 235) installed, used, offered, or otherwise accessible to the device (e.g., via a URL encountered by the device). The set of programs (e.g., 225, 230, 235) can also include remote or uninstalled programs associated with, bundled with, or accessed by programs installed on the device. Attributes can also include other information describing the particular device, include peripheral hardware connected to or in communication with the device, chipsets employed on the device, the type of network or network connection used by the device, the context of a device's operation, an account or enterprise associated with the device, and other information. Such attributes can be used to determine that particular objects whitelisted, for example, in one or more global whitelists (such as served by global whitelist manager 112), are applicable to the particular device. For instance, objects having a particular file type may likely only be encountered, used, or accessed by devices with those software applications making use of the object's file type. Accordingly, if the device does not include that particular program, the whitelist generator 250 can determine that any objects of this file type may be excluded from the tailored whitelist generated for the device. The whitelist generator 250 can repeat such determinations for other objects and object types based on associations between these objects and particular attributes identified for a particular device in generating a tailored whitelist for the particular device.

In addition to generating new tailored whitelists for particular computing devices, whitelist generator 250 can also be used to update and otherwise modify previously generated tailored whitelists. For example, if attributes of a particular device change, for instance, through the downloading of a new program, the changed attributes can be communicated to the tailored whitelist manager 135 causing a new or supplemental tailored whitelist to be generated by the whitelist generator 250 for the particular device. Additionally, as whitelisted items are added, either by tailored whitelist manager 135, global whitelist manager 112, or some other source, such new whitelisted objects may cause an updated whitelist to be generated by whitelist generator 250 for affected devices.

A tailored whitelist manager 135 can further include an object association engine 255 adapted to manage data structures and databases cataloguing associations between whitelisted objects and various device attributes, such as programs known to be installed on some subset of devices. Information included in the association data used and managed by object association engine 255 can be collected, for example, via scanning and analyzing of registries, configuration settings, folder structures, installed libraries, among other examples. As new whitelisted objects are discovered, for instance, using either whitelist generator 250 or global whitelist manager 112, a set of associations can be determined for the new objects that can be used to associate certain device attributes with corresponding, relevant whitelisted objects. Further, whitelist generator 250 can communicate with and query object association engine 255 in connection with the generation or update of a tailored whitelist. Further, object association engine 225 can include logic for identifying objects within a global whitelist that should be associated with a particular device attribute. Using such logic, object association engine 225 can automate the enormous task of building associations for each whitelisted object in whitelists potentially including a billion or more whitelisted objects. In one simplified example, object association engine 225 can identify an association between a particular file type, operating system, domain, etc. and one or more device attributes to automate the identification of whitelisted objects that also include the associated file type, operating system, domain, etc., among other examples.

FIG. 3 illustrates schematic representations 300 of example associations, or mappings (305, 310, 315) of particular whitelisted objects (e.g., 320, 325, 330) to device attributes, which in this simplified example include programs A-J. For instance, Program H can be associated with each of objects 1, 2, and 3, potentially resulting in each of the objects 1, 2, and 3 being included in whitelists generated for devices using, executing, or otherwise accessing Program H. Additionally, some objects, such as object 2, can be more specialized objects associated with fewer device attributes. For instance, in some implementations, devices that do not include programs A, D, or H, may have tailored whitelists generated that omit whitelisted object 2. Further, in some implementations, some attributes may be associatively included in a mapping to a particular object. For instance, program C is associated with example object 3. However, it can be determined that program C is closely related to, is bundled with, uses, or is used by other programs, resulting in programs G and J being associatively related to object 3. In this sense, the relationship between program C and programs G and J can result in programs G and J being associatively related to objects associated with or mapped to program C. Additionally, the presence of a particular attribute on a device can result in the device being associated with other indirect attributes, such as programs not installed on the device but bundled, used by, or otherwise affiliated with other programs that are installed on the device. Further, although the device is not directly associated with the uninstalled programs, particular objects associated with the uninstalled programs may nonetheless be included in a device's whitelist because another associated program is installed on the device. In short, attributes indirectly relevant to a device can also be considered in selecting whitelisted items for inclusion in the device's tailored whitelist.

In addition to indirect object-attribute associations, some objects may be identified as potentially relevant to a particular device based on predictions of the objects' relevancy to the device. Accordingly, such objects can be preemptively included in tailored whitelists generated for the device. For instance, actions detected on a device can indicate that the device is likely to begin accessing particular objects or object types. Such actions can include a user browsing to an application download page (i.e., indicating that a particular application, service pack, or update is likely to be installed on the device), or page known for serving particular types of objects. User- and device-specific profile attributes can also indicate that particular objects are likely to become relevant to the device. For example, device attributes can include user profiles associated with the device. For instance, information considering the user's occupation, demographic profile, favorite websites, web browsing habits or history can be used to predictively determine what objects the device is likely to encounter. For instance, a user with a profile indicating that the computing device is for use within the user's profession as an architect may prompt generation of a tailored whitelist that includes files and programs known to be of common use within the field of architectural design, etc.

Returning to FIG. 2, a tailored whitelist manager 135 can include a target device communication module 260 adapted for communicating with the plurality of devices for which the whitelist manager 135 generates, updates, or otherwise manages corresponding tailored whitelists. For instance, the target device communication module 260 can be used to send a generated tailored whitelist or whitelist update to a corresponding device or to another device (e.g., an outside security tool 110) for use in connection with one or more computer security tools. Further, target device communication module 260 can be used to request and receive data from target devices (e.g., 210, 215, 220) describing attributes of the target device, including, for example, a program set installed or stored (e.g., in memory 240, 245, 250) on the device (e.g., 210, 215, 220).

Further, tailored whitelist manager 135 can include a global whitelist manager communication module 265 for use in communicating and coordinating with one or more global whitelists used or accessed by the tailored whitelist manager 135 in generating tailored whitelists. For example, global whitelist manager communication module 265 can communicate with one or more different global whitelist managers (e.g., 112), and coordinate, for example, the updating of items in a global whitelist with items included in tailored whitelists generated by the tailored whitelist manager, as well as associations between whitelist items and device attributes. In some implementations, a tailored whitelist manager 135 can have access to one or more local global whitelists or copies of global whitelists, including global whitelists sent to the tailored whitelist manager 135 from a global whitelist manager (e.g., 112), for instance, using global whitelist manager communication module 265. Global whitelists accessed by the tailored whitelist manager 135 can be considered to be the pool from which whitelisted objects are pulled in the generation of device-tailored whitelists by the tailored whitelist manager 135.

Figure 4A:
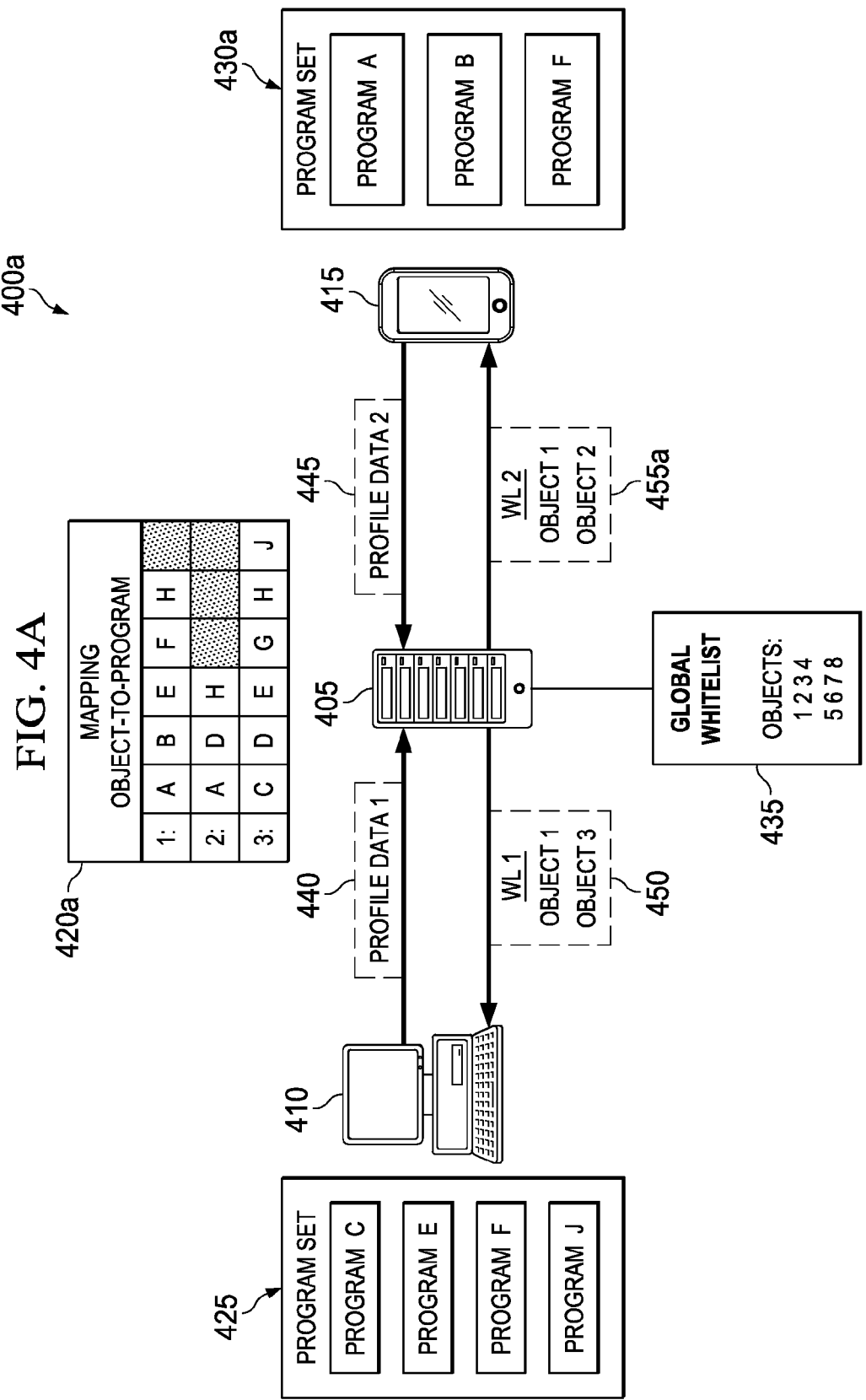
FIG. 4A-4B illustrate examples of generating device-tailored whitelists in accordance with at least some embodiments.
Figure 4B:
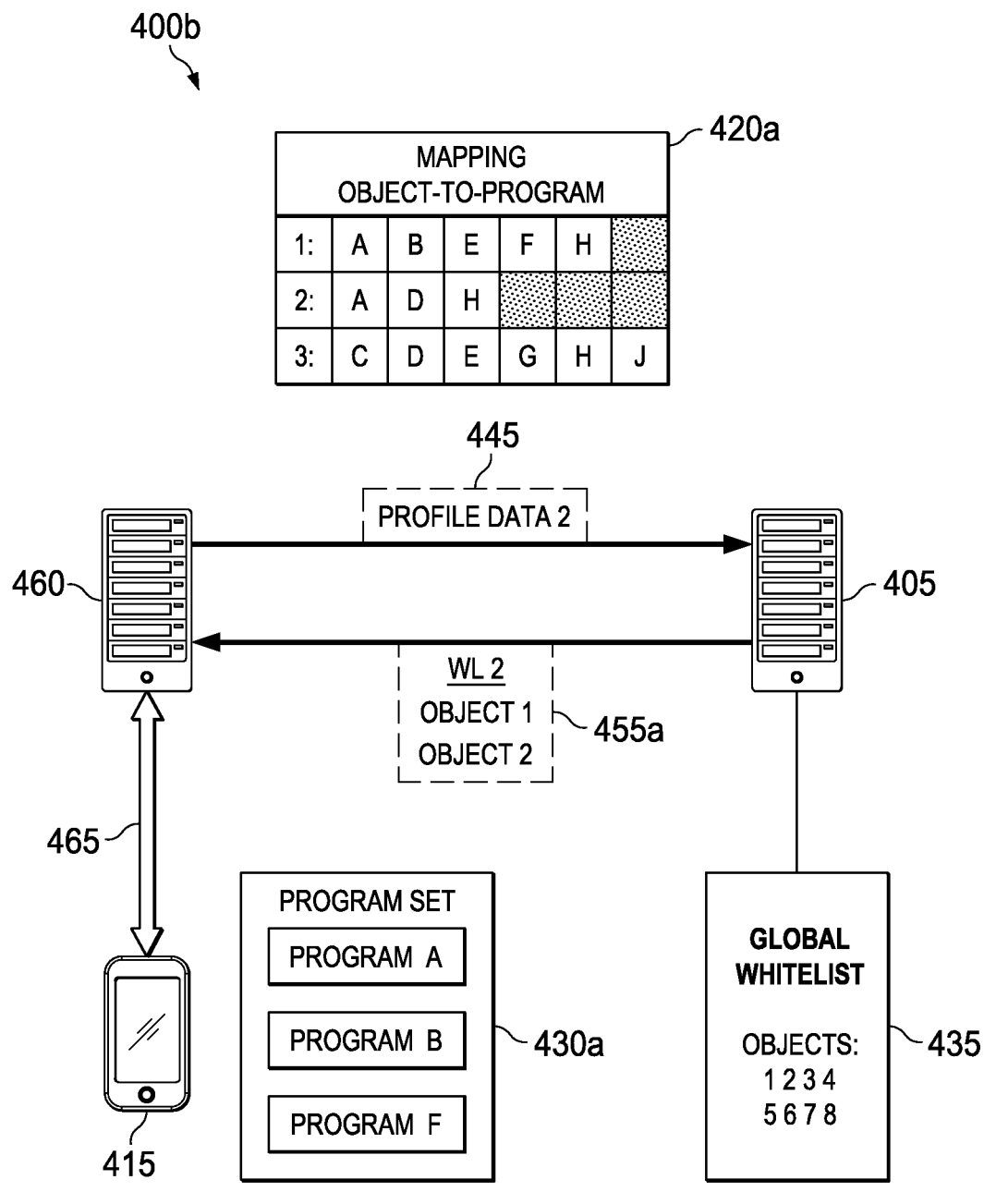

Turning now to FIGS. 4A-4B, schematic representations 400a-b are shown of example tasks and actions that can be performed, for instance, using implementations of a tailored whitelist manager. A tailored whitelist manager 405 can provide tailored whitelists for multiple different devices (e.g., 410, 415) according to profile data describing attributes of the respective devices. Such attributes can include the programs installed or used by the respective computing devices, such as shown in program sets 425, 430a. Programs, as well as other attributes can be mapped (at 420a) to whitelisted objects included in a global whitelist 435. In the particular example of FIG. 4A, profile data 440 can be sent from a first computing device 410 and collected by tailored whitelist manager 405 to generate a tailored whitelist WL1 450 for the first computing device. In this particular example, profile data 440 can communicate, among other attributes, that computing device's 410 program set 425 includes programs C, E, F, and J. Accordingly, tailored whitelist manager 405 can identify that device 410 includes programs C, E, F, and J and determine, using mapping 420a, that associated objects 1 and 3 (or associated whitelist sets or groups) are likely relevant to device 410 (e.g., given the device's association with programs C, E, F, and J). Consequently, whitelisted objects 1 and 3 can be included in the tailored whitelist 450 generated for device 410. Similarly, profile data 445 of a second device 415 can be sent and processed by the whitelist manager 405 to generate a corresponding tailored whitelist 455a. In this example, the attributes of the second device 415 differ from the attributes of the first device 410, including the respective program sets 425, 430a of the two devices 410, 415. Accordingly, the whitelist WL2 generated for the second device 415 can include whitelisted objects (e.g., object 2) not included in the whitelist WL1 generated for the first device 410. The whitelists WL1, WL2 can then be used by remote and/or local security devices to perform various computer security tasks on devices 410, 415 respectively.

Turning to FIG. 4B, as noted above, in some instances, outside security tools can use tailored whitelists in connection with the performance of security tasks on particular devices. For instance, service-oriented and cloud-based security tools exist for performing security tasks on mobile computing devices and other devices. Accordingly, in the example of FIG. 4B, a security tool 460 can be provided remotely to a monitored device 415. In connection with, for example, a security check session 465 between the security tool 460 and device 415, information can be exchanged identifying attributes of the device 415, including the device's program set 430a. In some implementations, security tool 460 can cache or otherwise maintain a record of such attributes. In this particular example, the security tool 460 acts as an intermediary or proxy with tailored whitelist manager 405 communicating the profile data 445 of device 415. The tailored whitelist manager 405, as in the example of FIG. 4A, can generate a tailored whitelist WL2 455a optimized for device 415 based on the communicated profile data 445. In other implementations, devices (e.g., 415) can communicate their profile data (e.g., 445) directly to the tailored whitelist manager 405, which can, in-turn, share generated tailored whitelists (e.g., 455a) with the outside security tool 460 for use by the outside security tool 460, among other examples. Such intermediate proxy whitelist servers (e.g., 460) may be particularly useful, for example, in homogeneous computer environments sharing large amounts of common software (e.g. in a particular office or enterprise).

Figure 5B:
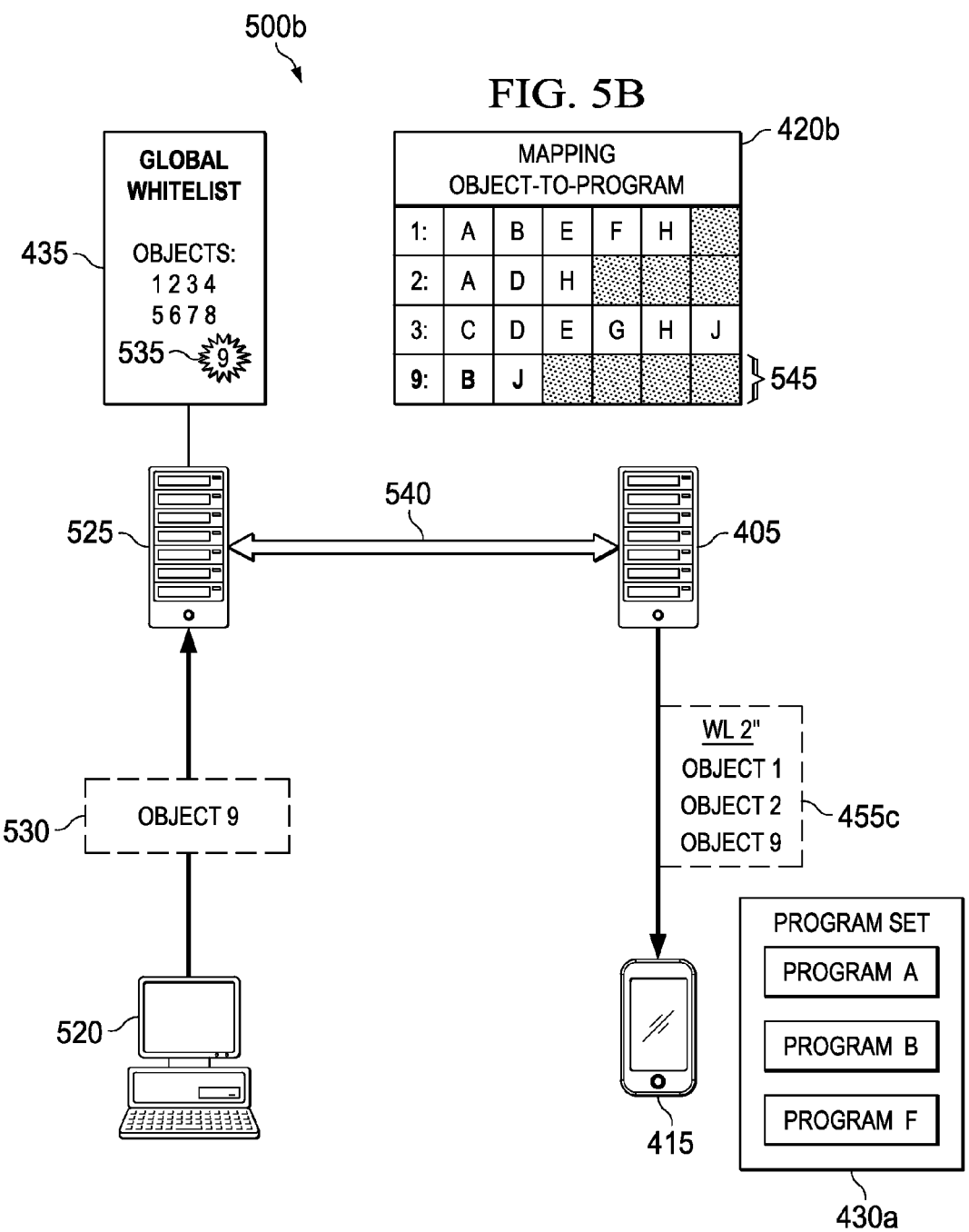

Turning now to the examples of FIGS. 5A-5B, schematic representations 500a-b are shown of additional example tasks and actions that can be performed, for instance, using implementations of a tailored whitelist manager 405. As noted above, in addition to generating new tailored whitelists, tailored whitelist manager 405 can also be used to assist in dynamic (or status) updating of previously-generated whitelists. For instance, in the example of FIG. 5A, a tailored whitelist manager 405 can be provided to prepare tailored whitelists for a plurality of computing devices, including computing device 415. In this example, tailored whitelist manager 405 has previously prepared a whitelist for device 415 (e.g., WL2 from the examples of FIGS. 4A and 4B) based on the device's previous attribute set, including program set (e.g., 430a). Changes to the device's 415 attributes can affect the objects that would be considered during security tasks involving a whitelist. Accordingly, in some implementations, a change in a device's attributes can prompt the generation of an updated tailored whitelist for the device 415. Such an update can include the sending of supplemental whitelist data (e.g., including only those whitelisted objects that are being added to the previous version of the tailored whitelist, etc.), data triggering the deletion of particular whitelist items (e.g., by the client target device in response to the deletion of a program), or sending of at least a partial new whitelist including whitelisted objects corresponding to the change in the device's attributes.

As an example, in FIG. 5A, target device 415 downloads a new program E (at 510) from application server 505, thereby changing the program set 430b, and attributes, of the device 415. In response to the change in attributes, update data 515 can be sent to tailored whitelist manager 405 indicating the changes to the device's profile data (defining its attributes). Update data 515 can be sent, for example, in connection with an agent, computer security application (such as anti-malware software), or other program installed on the device 415 capable of identifying changes to the device in substantially real time and triggering the communication of update data 515 to the tailored whitelist manager 405. The tailored whitelist manager 405 can receive the update data 515 and consult a mapping 420a to determine how the update profile data affects which whitelisted items are to be included in the device's tailored whitelist. Further, an updated whitelist 455b can be generated and sent to the device (or another device, such as a third-party computer security tool) in response to changes at the device (e.g., the downloading of program E 510). As noted above, in some implementations, sending updated whitelist WL2' 455b can include the sending of a replacement whitelist, a partial whitelist or other supplement including new whitelisted objects, data triggering the deletion or addition of objects determined to be removed or added to the whitelist, among other examples.

Turning to the example of FIG. 5B, whitelist updates can also be proactively triggered in response to changes or additions to a global whitelist (e.g., 435). For example, a global whitelist manager 525 can identify an object 9 (530) at one or more computing devices that is not included in a global whitelist 435. For instance, object 9 can be discovered in connection with security scans using global whitelist 435. Further, global whitelist manager 525 can determine that object 9 (53) is a non-malicious object and supplement 535 the global whitelist with the new object 530. Changes to a global whitelist 435 can affect tailored whitelists generated by tailored whitelist manager 405. Accordingly, global whitelist manager 525 can communicate changes to the global whitelist 435 to tailored whitelist manager 405. In some instances, global whitelist manager 525 can communicate changes to the global whitelist 435 in response to a request from the tailored whitelist manager 405. Tailored whitelist manager 405 can identify changes to the global whitelist 435 from data supplied by the global whitelist manager 525 and further define associations between new whitelisted items (such as object 9) and particular, known device attributes. For instance, in the simplified example of FIG. 5B tailored whitelist manager 405 updates a mapping of whitelisted objects to device attributes to generate an updated mapping 420b that includes associations 545 between the newly identified whitelisted object 9 and attributes B and J (corresponding to programs B and J).

A change to a global whitelist 435 used by tailored whitelist manager 405 can further trigger updates to tailored whitelists generated by tailored whitelist manager 405 for a plurality of different computing devices. For instance, in the particular simplified example of FIG. 5B, the addition of object 9 to global whitelist 435 can trigger the dynamic updating of the whitelist tailored for device 415. For example, from update mapping 420b, tailored whitelist manager 405 can determine that object 9 is relevant to device 415 based on the use or installation of program B on the device. Accordingly, an updated tailored whitelist WL 2" 455c (or supplement data adding object 9 to the previous version of device's 415 whitelist) can be sent from tailored whitelist manager 405 to device 405 or other devices hosting computer security tools using the tailored whitelist for device 405.

While FIGS. 4A-5B illustrate principles relating to some of the concepts described herein, it should be appreciated that the examples, techniques, implementations, and configurations shown and described in FIGS. 4A-5B are simplified for ease in illustrating these principles. For instance, it should be appreciated that the size and breadth of real world global whitelists and tailored whitelists used and generated can be very large in real-world systems. Additionally, the types of device attributes, mapping, and mapping algorithms can introduce additional features and complexity without departing from the present disclosure. Additionally, different implementations can be used than shown in these examples, including tailored whitelist managers serving far more client target devices than shown, as well as tailored whitelist managers integrated with a client target device or a global whitelist manager, among many other examples.

Figure 6:
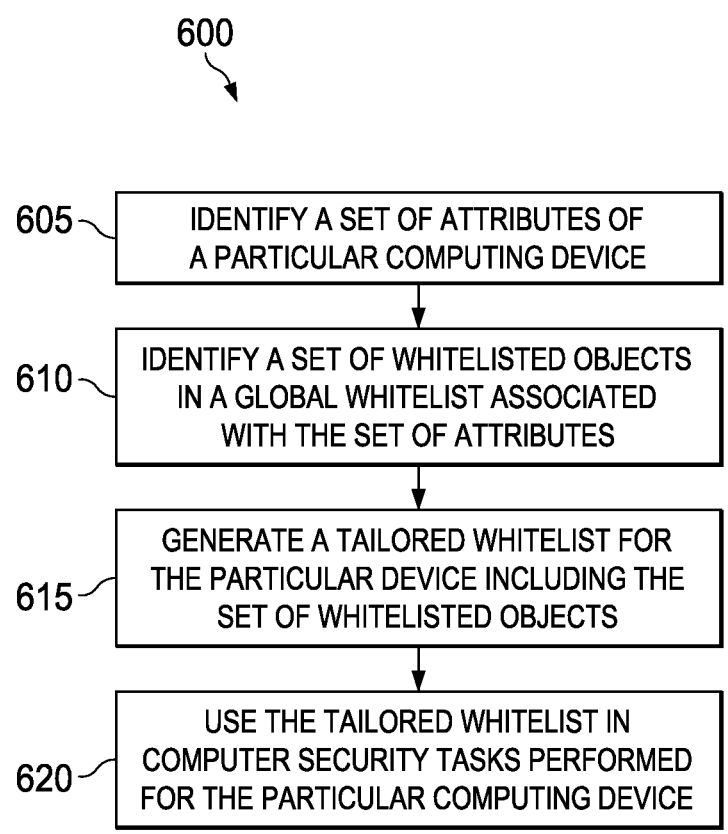
FIG. 6 is a simplified flowchart illustrating example operations associated with at least some embodiments of the system.

FIG. 6 is a simplified flowchart 600 illustrating an example technique for generating a tailored whitelist for a particular computing device. A set of attributes of a particular computing device can be identified 605. Such attributes can be identified 605, for example in data received or collected from the particular computing device or another device associated with the computing device. A set of whitelisted objects can be identified 610 in a global whitelist that are associated with attributes in the identified set of attributes. A mapping of whitelisted objects to particular device attributes can be consulted, in some implementations, in order to identify 610 the set of whitelisted objects corresponding to the particular computing device's attributes. A tailored whitelist can be generated 615 for the particular device that includes the set of whitelisted objects. Such tailored whitelists can be generated 615 and used 620 in connection with security tasks performed on the particular device, such as using the tailored whitelist to exclude programs from scanning in a malware scan, exclude programs from being analyzed behaviorally, reduce suspicion for objects created by already whitelisted programs, block software except whitelisted software (e.g., enforcing the whitelist), avoid network access to check the reputation of software included in the whitelist, as well as other examples, uses, and combinations thereof.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, diverse user interface layouts and functionality can be supported. Additionally, while the above description focuses on applying the above principles to the generation of customized whitelists, similar principles can be applied to generating other such listings used in security tasks, including tailored blacklists. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory, machine-accessible storage medium having instructions stored thereon, the instructions when executed on a machine, cause the machine to:
    identify a particular set of attributes of a particular computing device, wherein the particular set of attributes include one or more software programs identified as potentially used by the particular computing device and at least one user attribute corresponding to expected usage of the particular computing device by at least one particular user;
    determine that a first set of whitelisted objects in the global whitelist are usable by the one or more programs based on the identified particular set of attributes;

predict, based on the at least one user attribute, that a second set of whitelisted objects in the global whitelist will be accessed by the at least one user; and generate a particular whitelist tailored to the particular computing device, wherein the particular whitelist is to comprise a subset of whitelisted objects in the global whitelist, and the subset of whitelisted objects comprises the first and second sets of whitelisted objects.

2. The at least one non-transitory, machine-accessible storage medium of claim 1, wherein the one or more software programs include at least one of an operations system, application, software agent, driver, library or plugin.

3. The at least one non-transitory, machine-accessible storage medium of claim 1 wherein the one or more software programs are installed on the particular computing device.

4. The at least one non-transitory, machine-accessible storage medium of claim 1, wherein the instructions, when executed, further cause the machine to:

identify a second set of attributes of a second computing device, the second set of attributes different from the particular set of attributes;

identify a second plurality of whitelisted objects, in a global whitelist, corresponding to the second set of attributes, the second plurality of whitelisted objects different from the first plurality of whitelisted objects; and generate a second whitelist including the second plurality of whitelisted objects.

5. The at least one non-transitory, machine-accessible storage medium of claim 1, wherein the particular whitelist is used to perform at least one computer security task relating to the particular computing device.

6. The at least one non-transitory, machine-accessible storage medium of claim 5, wherein the instructions, when executed, further cause the machine to serve the particular whitelist to a particular client configured to perform the security task.

7. The at least one non-transitory, machine-accessible storage medium of claim 6, wherein the particular client is local to the particular computing device.

8. The at least one non-transitory, machine-accessible storage medium of claim 1, wherein the particular computing device comprises a mobile communications device.

9. The at least one non-transitory, machine-accessible storage medium of claim 1, wherein the instructions, when executed, further cause the machine to:

identify an update to the global whitelist;

identify at least one update for the particular whitelist corresponding to the update to the global whitelist; and cause an updated version of the particular whitelist to be generated corresponding to the at least one update.

10. The at least one non-transitory, machine-accessible storage medium of claim 9, wherein the instructions, when executed, further cause the machine to send at least a portion of the updated version of the particular whitelist to a computing device tasked with performing computer security tasks on the particular computing device.

11. The at least one non-transitory, machine-accessible storage medium of claim 9, wherein the update to the global whitelist includes the addition of at least one new whitelist object, and the instructions, when executed, further cause the machine to map associations between the at least one new whitelist object and at least one device attribute.

12. The at least one non-transitory, machine-accessible storage medium of claim 1, wherein the instructions, when executed, further cause the machine to:

identify a change to a set of programs on the particular computing device;

determine at least one update to the particular whitelist corresponding to the identified change on the particular computing device; and cause an updated version of the particular whitelist to be generated corresponding to the at least one update.

13. The at least one non-transitory, machine-accessible storage medium of claim 12, wherein the change is a predicted change and the at least one update to the particular whitelist is determined prior to the change being implemented on the particular computing device.

14. The at least one non-transitory, machine-accessible storage medium of claim 13, wherein at least a portion of the updated version of the particular whitelist is sent to a computing device tasked with performing computer security tasks on the particular computing device prior to the change being implemented on the particular computing device.

15. A method comprising:

identifying, using at least one processor device, a particular set of attributes of a particular computing device, wherein the particular set of attributes include one or more software programs identified as potentially used by the particular computing device and at least one user attribute corresponding to expected usage of the particular computing device by at least one particular user;

determining a first plurality of whitelisted objects, in a global whitelist, corresponding to the particular set of attributes, wherein determining the first plurality of whitelisted objects includes:

determining that a first set of whitelisted objects in the global whitelist are usable by the one or more programs based on the identified particular set of attributes; and predicting, based on the at least one user attribute, that a second set of whitelisted objects in the global whitelist will be accessed by the at least one user; and generating a particular whitelist tailored to the particular computing device, wherein the particular whitelist is to comprise a subset of whitelisted objects in the global whitelist, and the subset of whitelisted objects comprises the first and second sets of whitelisted objects.

16. A system comprising:

at least one processor device;

at least one memory element; and a tailored whitelist manager, adapted when executed by the at least one processor device to:

identify a particular set of attributes of a particular computing device, wherein the particular set of attributes include one or more software programs identified as potentially used by the particular computing device and at least one user attribute corresponding to expected usage of the particular computing device by at least one particular user;

determine that a first set of whitelisted objects in the global whitelist are usable by the one or more programs based on the identified particular set of attributes;

predict, based on the at least one user attribute, that a second set of whitelisted objects in the global whitelist will be accessed by the at least one user; and generate a particular whitelist tailored to the particular computing device, wherein the particular whitelist is to comprise a subset of whitelisted objects in the global whitelist, and the subset of whitelisted objects comprises the first and second sets of whitelisted objects.

17. The system of claim 16, wherein the tailored whitelist manager is further to generate, from the global whitelist, a respective whitelist for each of the plurality of computing devices and each whitelist is to be tailored to corresponding attributes of the respective computing device.

* * * * *

UNITED STATES PATENT AND TRADEMARK OFFICE
CERTIFICATE OF CORRECTION

PATENT NO.       : 9,262,624 B2
APPLICATION NO.  : 13/234985
DATED            : February 16, 2016
INVENTOR(S)      : Igor Muttik Page 1 of 1

It is certified that error appears in the above-identified patent and that said Letters Patent is hereby corrected as shown below:

In the claims,

In column 17, line 11, in claim 2, delete "operations" and insert -- operating --, therefor.

Signed and Sealed this
Twenty-third Day of August, 2016

Michelle K. Lee
*Director of the United States Patent and Trademark Office*